J. SMITH.
SCENIC AMUSEMENT APPARATUS.
APPLICATION FILED NOV. 11, 1918.
1,340,570.
Patented May 18, 1920.
3 SHEETS—SHEET 1.
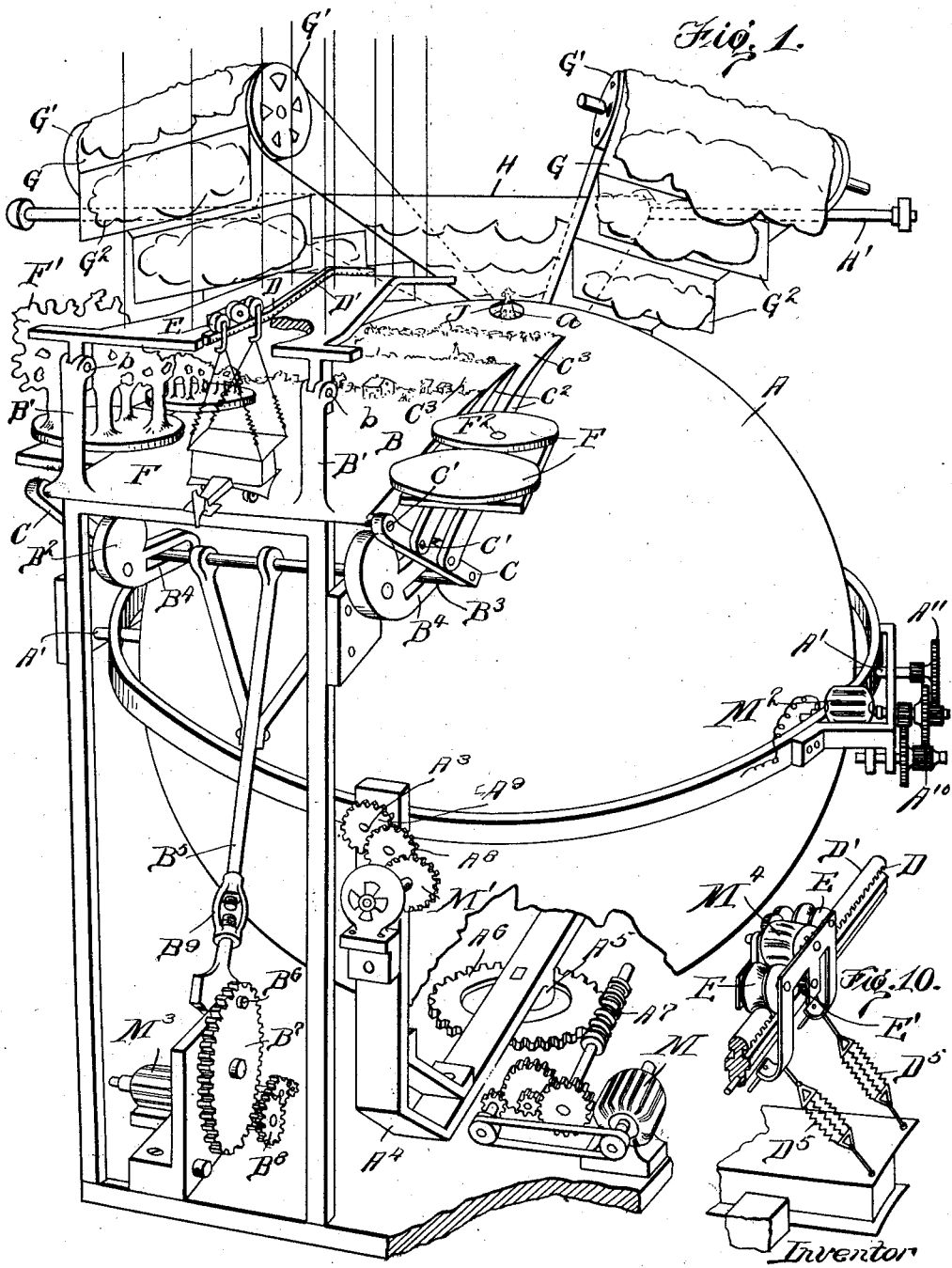

J. SMITH.
SCENIC AMUSEMENT APPARATUS.
APPLICATION FILED NOV. 11, 1918.
1,340,570. Patented May 18, 1920.
3 SHEETS—SHEET 2.
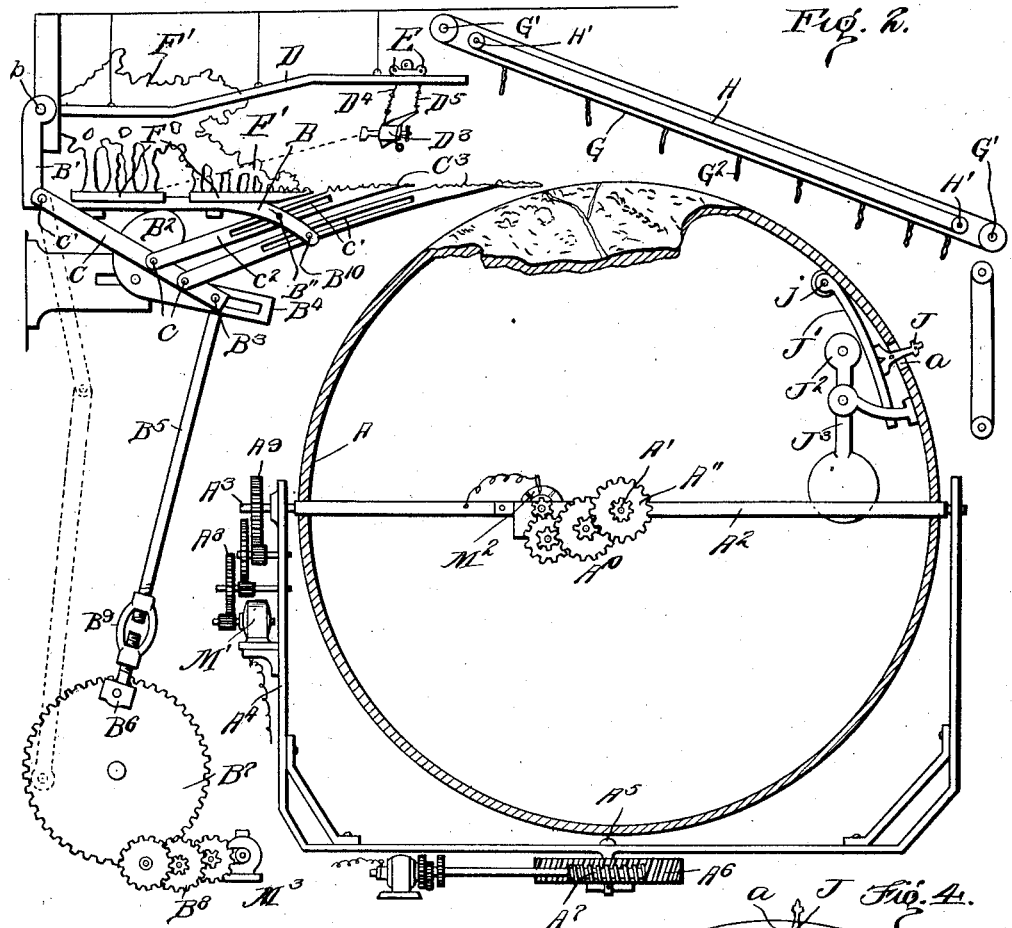
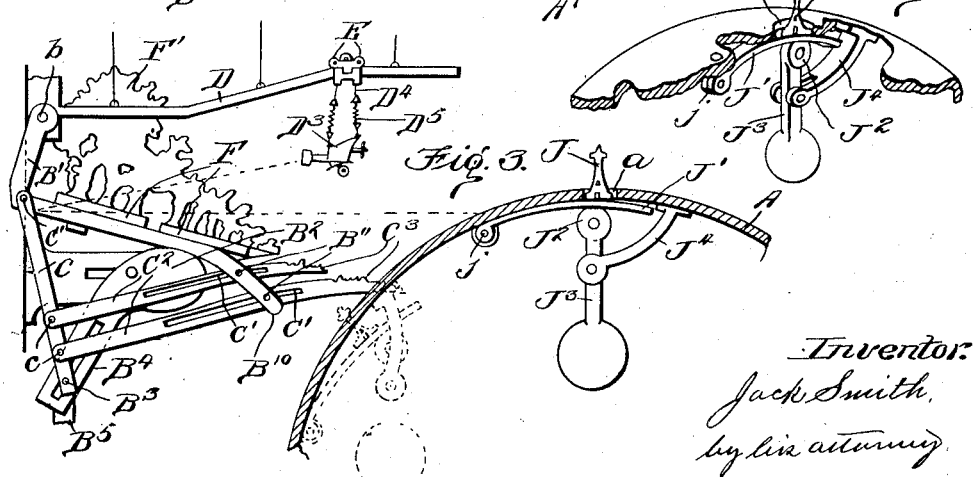
Inventor:
Jack Smith,
by his attorney,
Charles R. Searle.

J. SMITH.
SCENIC AMUSEMENT APPARATUS.
APPLICATION FILED NOV. 11, 1918.
1,340,570.
Patented May 18, 1920.
3 SHEETS—SHEET 3.
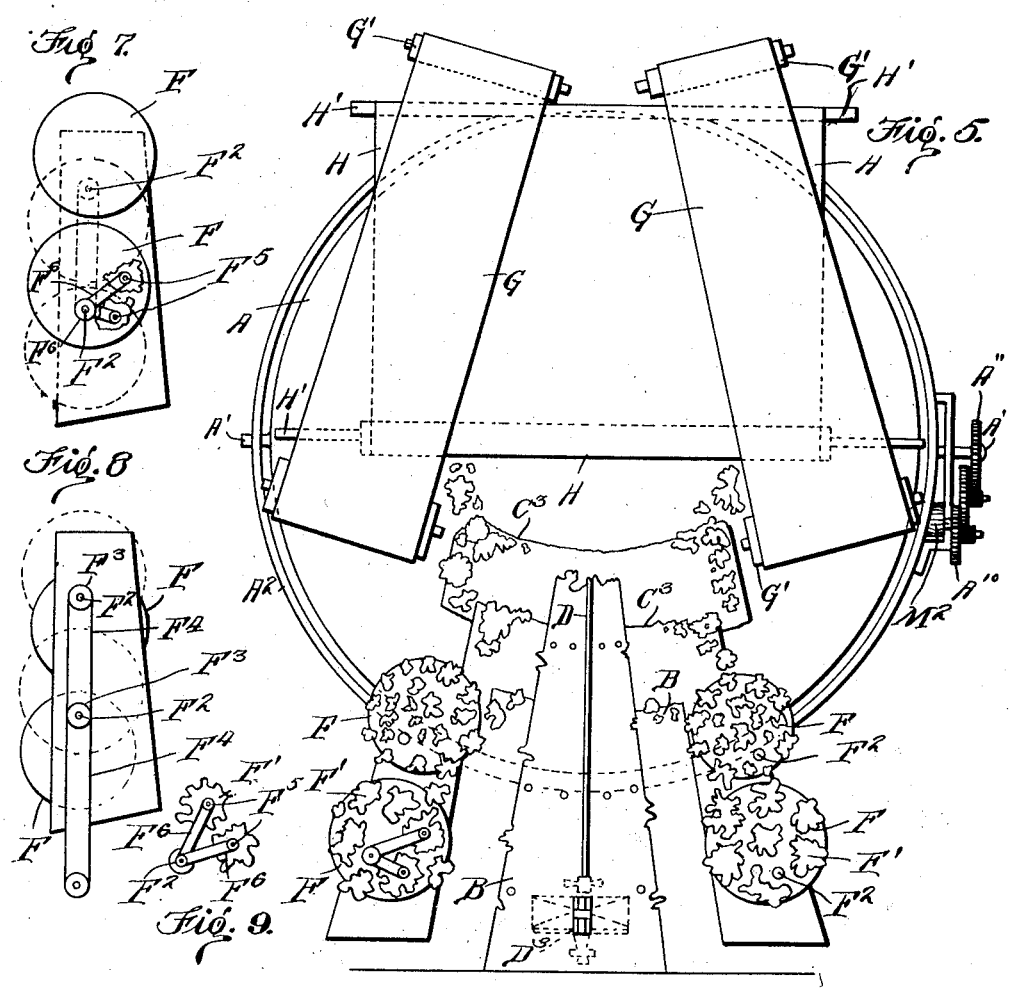
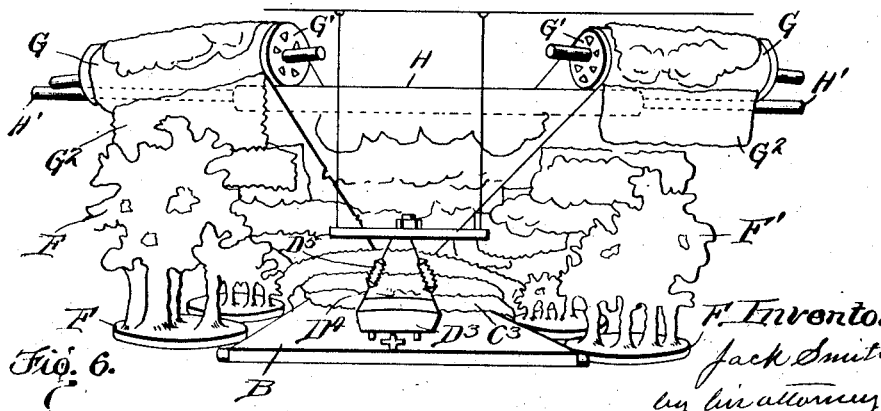

UNITED STATES PATENT OFFICE.

JACK SMITH, OF NEW YORK, N. Y.

SCENIC AMUSEMENT APPARATUS.

1,340,570.     Specification of Letters Patent.     Patented May 18, 1920.

Application filed November 11, 1918. Serial No. 261,998.

*To all whom it may concern:*

Be it known that I, JACK SMITH, a citizen of the United States, residing in the city of New York, borough of Bronx, and county of Bronx, State of New York, have invented a certain new and useful Improvement in Scenic Amusement Apparatus, of which the following is a specification.

The invention relates to devices for producing sensations of movement, distance and space, in the mind of the observer. The sensation of transition or travel is the consciousness in the mind of the relativity between stationary and moving objects, established mainly through vision and partly by the sense of momentum. Thus in a fast moving train the scenery appears to fly past, and the laws of vision convince the mind that this apparent movement is real even in the face of reason. The invention is based on this quality of the human mind, and the object of the invention is to provide an apparatus and scenic accessories by which the observer is given the sensation or illusion of traveling through the air and viewing from a great height scenery and objects of interest upon the surface of the earth.

The invention consists in certain novel features and mechanical appliances by which the above object is attained, to be hereinafter described and claimed.

In the form of the invention illustrated and to be described, the illusion is built around an airplane journey; the traveler enters an inclosed building and stands in the foreground of a picture looking forward over a perspective ending in the horizon. He believes the entire perspective is real because the foreground in which he stands is actually real, a real roadway, real trees and other objects at hand, and a real airplane, the line between the real and painted scenery is so merged as to be indistinguishable. He clambers into the real airplane and the latter is started and actually moves forward on its wheels under the conditions attending a real flight. The observer's mind is thus convinced of the actuality. The airplane leaves the ground which sinks beneath him, the trees and other objects move rearwardly in a natural manner and the airplane with its occupants seems to be traveling forward at a great height from which the surface of the earth bounded by a moving horizon, is viewed. The illusion is complete although the actual forward movement of the airplane was only a few feet and its rise a correspondingly short distance.

The accompanying drawings form a part of this specification and show the invention as applied to the above airplane journey.

Figure 1 is a perspective view of the apparatus, with certain portions broken away or omitted to show the parts beyond. Fig. 2, is a side elevation, partly in vertical section. Fig. 3 is a side elevation corresponding to a portion of Fig. 2, showing the means for depressing the platform beneath the airplane or observer's station, in the lowered condition. Fig. 4 is a perspective view of a device for changing the apparent altitude of a tower or the like upon the scene beneath. Fig. 5 is a general plan view of the apparatus. Fig. 6 is a perspective view of the upper portion of the apparatus. Figs. 7, 8 and 9 are plan views showing details of the means for moving certain portions of the scenery. Fig. 10 is a perspective view of a trolley supporting the airplane or other station for the observer.

Similar letters of reference indicate the same parts in all the figures.

The apparatus is installed in a large inclosing structure, not shown, having a vertical depth sufficient to receive a great hollow globe A mounted on horizontal trunnions $A^1$ in a ring $A^2$ supported on horizontal pins $A^3$ in a frame $A^4$ carried on a vertical stud or pivot $A^5$ beneath the globe. The frame $A^4$ is revolved on its stud $A^5$ by a wormwheel $A^6$ in mesh with a worm $A^7$ driven by an electric motor M. A train of gearing $A^8$ carried on one of the uprights of the frame $A^4$ meshes with a pinion $A^9$ on one of the pins $A^3$ driven by a motor $M^1$ tilts the ring $A^2$ and globe A laterally, and a train of gearing $A^{10}$ on the ring $A^2$ meshes with a gearwheel $A^{11}$ on the trunnion $A^1$, driven by a motor $M^2$ rotates the globe in the ring, thus the globe may be turned in any direction to bring the scenery on its surface into view from above. On the surface of the globe is built in relief and flat the scenery, mountains, rivers, plains, cities and other features of the landscape.

B is a platform at the entrance to the apparatus, carried at each side at the rear by a vertical arm $B^1$ pivoted to a fixed portion of the building at $b$ and supported by cams $B^2$ which in the position shown in Fig. 2 hold the platform level, but when partially rotated to the position shown in Fig. 3, tilt the platform at an inclination downward toward the globe A and also move it rearwardly. The tilting is effected by the movement of a pin $B^3$ in the slotted arm $B^4$ of the cam, actuated by a link $B^5$ attached to a crank-pin $B^6$ in a gearwheel $B^7$ driven by a train of gearing $B^8$ from a motor $M^3$. The link $B^5$ is adjustable as to length by a turnbuckle $B^9$.

A lever C at each side of the platform extends from the pin $B^3$ to a pivot $C^1$ at the rear of the platform and carries arms $C^2$ extending forwardly and upwardly toward the upper portion of the globe, on which are mounted shelves or aprons $C^3$ curved concavely at the front to match approximately to the curve of the globe along the line of contact with the latter. These shelves or aprons $C^3$ overlap and are arranged one behind the other to form a retractible continuation of the platform B, and the arms $C^2$ on which they are mounted are pivoted to the levers C at $c$ and each is slotted as at $c^1$, see Figs. 2 and 3, to receive studs $B^{10}$ on arms $B^{11}$ secured to the platform, serving as guides to induce the required forward and rearward and up and down angular movements of the shelves, controlled by the position of the platform B as determined by the cams $B^2$.

Attached to a fixed portion of the building is a suspended track D extending forwardly and having a horizontal rear portion joined to an upwardly inclined portion and terminating in a second horizontal portion at a higher level. The overhung part of the track is supported at intervals from above and has a smooth rail $D^1$ on which run the wheels E of a trolley-frame carrying a pinion $E^1$ in mesh with a toothed rail $D^2$ on the under face of the overhung portion of the rail $D^1$, see Fig. 10, driven by a motor $M^4$ on the trolley-frame. From the latter is suspended the observer's seat or station shown as an airplane $D^3$, the suspension rods $D^4$ being provided with springs $D^5$ to impart a degree of resiliency to the airplane and its occupants and aid in the illusion.

The airplane is provided with supporting wheels as usual and has wings, propeller, and other accessories simulating a fully equipped airplane of any preferred type but arranged to carry a number of observers and afford a view forwardly and downwardly. It is moved forward on the track by the action of the motor $M^4$.

On lateral extensions of the platform B and tilting therewith are circular platforms or tables F set one in advance of the other in series at each side, carrying trees $F^1$, those on the rear tables larger and taller than those at the front; these tree-tables are preferably mounted eccentrically on vertical shafts $F^2$ having pulleys $F^3$ on which run belts $F^4$ driven from a motor not shown, see Figs. 7 and 8, by which the series of groups of trees are caused to appear to move rearwardly, and some or all the trees are mounted to rotate on vertical shafts $F^5$ driven by belts $F^6$ from the platform shafts $F^2$, see Figs. 7 and 9.

Above the globe and extending rearwardly from a point forward thereof, are wide bands or belts G running on horizontal drums $G^1$ set angularly to each other so that the bands diverge from front to rear and reach well over the advanced position of the observer's station. These bands are painted to resemble the sky and carry depending strips or curtains $G^2$ shaped and painted to simulate floating clouds or other aerial objects, which hang by gravity from the lower members of the bands as the latter are traversed. Extending through the loops or bights of the bands G are horizontal rollers $H^1$ carrying a broad band H overlapped at its edges by the divergent bands G. The latter with the central band H are driven by any suitable means, not shown, to advance their under faces at any required speed.

An object of considerable height in the scene, as a tower J for example, to be viewed on the globe from the airplane, is projected through an opening $a$ in the shell of the globe and is mounted on a freely swinging arm $J^1$ pivoted on the interior of the shell at $j$ and is controlled by a roller $J^2$ on a pendulum $J^3$ mounted to swing in a bracket $J^4$ secured on the inner face of the globe in proper relation to the arm $J^1$, see Figs. 2, 3 and 4, and arranged to cause the tower to protrude farther through the opening $a$ as it approaches the highest point in its travel due to the rotation of the globe, and to recede or retract gradually in its descent from such point.

All the several movements of globe, platform, cloud-bands, tree-tables and airplane are synchronized to produce the desired illusionary effects, and the vision of the observer is limited by gauze screen and proper arrangements of lights and shadows in the manner employed by scenic artists in producing analogous effects on the theatrical stage, and need not be described or shown. The several electric motors may be controlled from the airplane or from a switchboard concealed in the building, which may operate automatically in conducting the illusionary air flight.

On entering the airplane the latter is started forward on the platform B passing the real trees mounted on the tables F which turn eccentrically and induce the sensation of rapid rearward movement of near objects and the apparent forward movement of more distant objects. The revolution of the tree-tables F throws the nearer trees back and as the table turns appears to move back all the trees thereon; these two combined movements nullify the slowing down of the airplane unnoticed by the observer. The size of the successive trees on the tables diminishes greatly to conform to the rule of perspective as it would be portrayed on a flat surface, and other objects on the platform B also conform to the requirements of scenic perspective.

When the airplane has traveled on its own wheels part way along the platform, the latter begins to sink through the action of the cams $B^2$ and their connected mechanism and also moves rearwardly through the same means, and simultaneously the airplane rises from the platform and traverses the inclined portion of the track D. The observer's first vision of the platform or runway is a continuous scene to the horizon; this is effected by bridging the horizon and foreground by the series of shelves or aprons $C^3$ which are attached to the platform mechanism and retract and sink as the airplane rises, thus the angular lowering and retraction of the platform and shelves and the simultaneous rise of the airplane creates the sensation of ascension to a great height.

The scenery at the edge of the farthest projecting shelf $C^3$ is built to fuse or blend visually with the scenery on the globe A which revolves toward the observer at the same rate as the receding shelves, but as the actual travel of the airplane is well over the globe the vanishing of the platform and shelf scenery from the vision of the observer leaves him looking down from the apparent great height upon a circular disk of the earth bounded in such directions as are open to his vision by a circular horizon.

At this point the action or actual travel of the airplane ceases and the feeling or sensation of advancement has been transferred to the revolving globe, and the feeling is the same as that actually experienced in a balloon, that the observer is stationary and the earth moving beneath. The several movements of the globe are so controlled that any point in the landscape presented may be caused to pass directly into the apparent path of the airplane, thus producing the sensation of change of direction, as in circling about over a city or other object.

As the revolving globe brings new scenery over the horizon toward the observer the device on the interior of the globe, actuated by the pendulum $J^3$ causes buildings, towers, or other elevated landmarks to rise higher and agree with the sensation of aerial flight; this protrusion begins as the prominence approaches the top of the globe and comes into view of the observer, reaches its maximum projection at the top of the globe, and gradually sinks as it passses from view beneath the airplane.

The entire inclosure or building in which this illusion apparatus is contained reproduces the firmament or sky, mostly stationary background effects but is also provided with the moving bands G H carrying simulations of moving clouds.

The shape of the visible portion of the runway or platform is convergent toward the horizon to agree with the rules of perspective, and the bands G H begin high above the sides and forward end of the platform and then converge to the same theoretical vanishing-point as the terrestrial scenery. The painting of the bands agrees with that of the interior of the building and is therefore practically invisible excepting such parts as the clouds on the depending wings or curtains $G^2$ of invisible netting. The effect is that the observer sees before him clouds rising from the horizon and advancing in rising and divergent paths so that as in real nature they float higher and spread to the sides of the observer. The central band H is also equipped with curtains or wings bearing clouds. This wide central band lies between the upper and lower members or bights of the side bands, which arrangement permits the lower faces of all the bands to lie in practically the same plane and also conceals the under faces of the upper members of the side bands. The motion of these cloud bands is steady and agrees with the advance rotation of the globe.

As before stated, all the movements are synchronized, the scene painters art and scenic lighting effects are utilized, sufficient noise created by the airplane propeller or otherwise to drown the sounds of the moving mechanism, and to the observer the illusion is complete and interesting. The scenes apparently visited may be as true to nature as desired or may partake of the fantastic or imaginary to any degree.

Modifications may be made within wide limits. The means for producing the desired movements may be varied. Parts of the invention may be used without the whole, and the forms and proportions varied to suit conditions.

Although the complete globe is shown and is preferred as offering the fullest exposition of the invention, it will be understood that a hemisphere or other segment of a sphere may be employed, or in situations in which height or depth is limited, a plane moving surface or a folding spherical surface or other suitable scenic arrangement may be substituted for the globe.

Any elevated observer's station may be substituted for the airplane.

I claim:—

1. A horizontally disposed surface carrying thereon a scene to be viewed, an observer's station suspended above said surface, means for moving said surface, and means for moving said station transversely above said surface.

2. A spherical surface carrying a scene to be viewed from above, means for moving said surface, and an observer's station suspended above said surface to permit an unobstructed view of such scene.

3. A spherical surface carrying a scene to be viewed from above, an observer's station suspended above said surface to permit an unobstructed view of such scene, and means for moving said station.

4. A spherical surface carrying a scene to be viewed from above, a track extending above said surface, an observer's station suspended from said track to permit an unobstructed view of such scene, and means for moving said station along said track.

5. A spherical surface carrying a scene to be viewed from above, a track extending above said surface, and having one end higher than the other, an observer's station suspended from said track to permit an unobstructed view of such scene, and means for moving said station along said track.

6. A spherical surface carrying a scene to be viewed from above, an observer's station suspended above said surface to permit an unobstructed view of such scene, and means for moving said surface and said station relatively to each other.

7. A horizontally disposed surface carrying a scene to be viewed, an observer's station suspended above said surface, means for moving said station, a platform adjacent said surface and beneath said station, and means for lowering said platform.

8. A horizontally disposed surface carrying a scene to be viewed, an observer's station suspended above said surface, a platform adjacent said surface and beneath said station, means for moving said surface, means for lowering said platform, a shelf between said platform and surface, and means for retracting and lowering said shelf.

9. In an apparatus of the character set forth, a spherical surface, means for rotating said surface on vertical and horizontal axes, a platform hinged at the rear and extended toward said surface, means for tilting said platform downwardly, and a movable observer's station above said surface and platform.

10. In an apparatus of the character set forth, a spherical surface, means for rotating said surface on vertical and horizontal axes, a platform hinged at the rear and extended toward said surface, a series of overlapping shelves carried by said platform and extending upon said surface, means for tilting said platform downwardly and for retracting said shelves, and a movable observer's station above said platform and surface.

11. In an apparatus of the character set forth, a spherical surface, means for rotating said surface on vertical and horizontal axes, a platform hinged at the rear and extended toward said surface, a series of overlapping shelves carried by said platform and extending upon said surface, means for tilting said platform downwardly and for retracting said shelves, and a movable observer's station above said platform and surface, a track above said platform and surface, and means for moving said station along said track.

12. In an apparatus of the character set forth, a horizontally disposed surface carrying a scene to be viewed, means for moving said surface, a platform adjacent said surface, and revoluble tables carried by said platform, and means for rotating said tables.

13. In an apparatus of the character set forth, a horizontally disposed surface carrying a scene to be viewed, means for moving said surface, a platform hinged at the rear and extended toward said surface, means for tilting said platform downwardly, revoluble tables mounted on said platform, means for rotating said tables, an observer's station suspended above said platform and surface, and means for moving said station.

14. In an apparatus of the character set forth, a spherical surface, means for rotating said surface on vertical and horizontal axes, a platform hinged at the rear and extended toward said surface, a series of overlapping shelves extending upon said surface from said platform, revoluble tables eccentrically mounted on said platform, a track above said platform and surface, an observer's station carried by said track, and means for moving said station along said track.

15. In an apparatus of the character set forth, a horizontally disposed surface carrying a scene to be viewed, an observer's station above said surface, scenic bands arranged above said surface, and means for traversing said bands.

16. In an apparatus of the character set forth, a horizontally disposed surface carrying a scene to be viewed, an observer's station above said surface, scenic bands arranged divergently above said surface, and means for traversing said bands.

17. In an apparatus of the character set forth, a horizontally disposed surface carrying a scene to be viewed, an observer's station above said surface, scenic bands arranged above said surface, means for traversing said bands, and curtains suspended from said bands.

18. In an apparatus of the character set forth, a horizontally disposed surface carrying a scene to be viewed, an observer's station above said surface, angularly disposed drums carrying divergent bands separated from each other, rollers extended through the bights of said divergent bands and carrying a scenic band, and means for traversing said bands.

19. In an apparatus of the character set forth, a spherical shell carrying on its exterior a scene to be viewed, means for revolving said shell on a horizontal axis, an observer's station above said shell, an object of scenery mounted on the interior of said shell, and means for projecting such object through an opening in said shell.

20. In an apparatus of the character set forth, a spherical shell carrying on its exterior a scene to be viewed, means for revolving said shell on a horizontal axis, an observer's station above said shell, an object of scenery mounted on the interior of said shell and arranged to be projected through an opening in the latter, and means actuated by gravity for projecting and retracting such object by the movement of said shell.

21. In an apparatus of the character set forth, a spherical shell carrying on its exterior a scene to be viewed, a ring encircling said shell, trunnions supporting said shell in said ring and means for moving said shell therein, pins on said ring arranged at a right angle to said trunnions, a horizontally rotatable frame receiving said pins, means for rotating said frame and tilting said ring, and an observer's station suspended above said shell.

22. In an apparatus of the character set forth, a horizontally disposed surface carrying a scene to be viewed, means for moving said surface, a platform extended toward said surface, means for lowering said platform, revoluble tables mounted on said platform, means for rotating said tables, objects rotatably mounted on said tables, means for rotating said objects, and an observer's station above said surface and platform.

23. In an apparatus of the character set forth, a horizontally disposed surface carrying a scene to be viewed, means for moving said surface, a platform extended toward said surface, an observer's station arranged to be moved forwardly along said platform and to be lifted therefrom during a portion of such forward movement.

In testimony that I claim the invention above set forth I affix my signature.

JACK SMITH.